Aug. 25, 1953     W. F. ALBERS     2,650,041
CLOTHESLINE REEL UNIT
Filed May 21, 1951
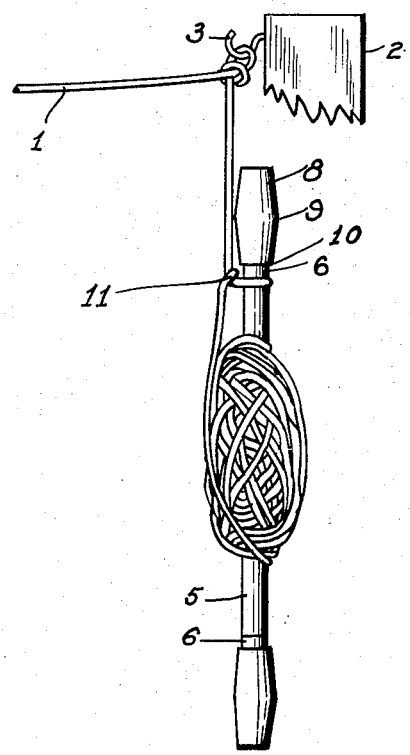
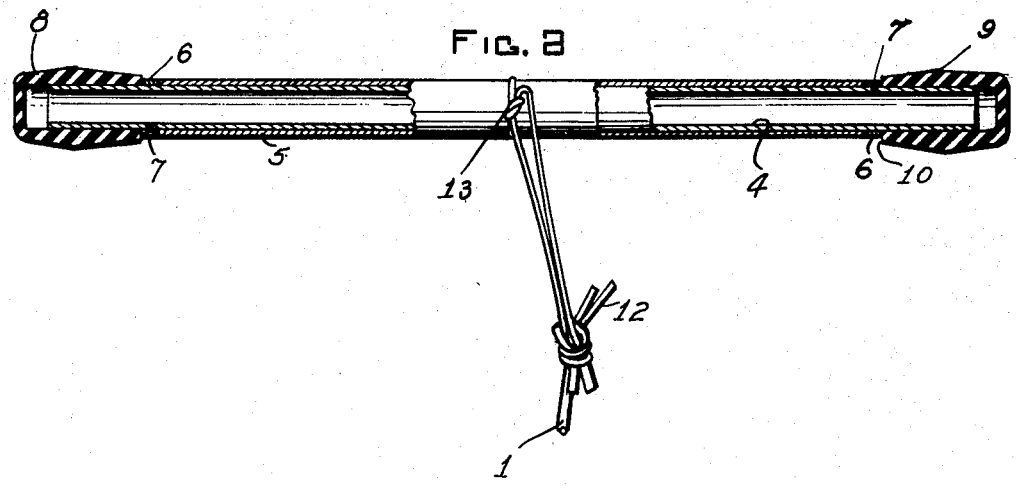
INVENTOR.
WILLIAM F. ALBERS
BY:
Ben V. Zillman
ATTORNEY Patented Aug. 25, 1953

2,650,041

UNITED STATES PATENT OFFICE 2,650,041

CLOTHESLINE REEL UNIT

William F. Albers, Florissant, Mo.

Application May 21, 1951, Serial No. 227,453

2 Claims. (Cl. 242—96)

1

This invention relates to holders for flexible cords, such as clothes-lines, and has among its objects such a device that will be neat and simple in form, construction and appearance, shall be of but few parts, light and compact so that it will occupy a minimum of storage space when not in use and will not be cumbersome to manipulate while in use, and which will be otherwise satisfactory for use wherever deemed applicable.

One of the principal objects of my invention is to so construct a device of this kind, that the line may be smoothly and evenly wound thereon and unreeled therefrom, so as to facilitate the effort required in such operations.

Another object of the invention is to so construct a device of the character described, that there will be a minimum amount of kinking and similar distortions of the line when the device is employed for this service, and wherein it will be extremely easy to prevent the line from dragging or contacting the ground, thereby prolonging the effective life of the line, but also keeping the same in a clean condition for use.

A further object of my invention is to construct such a reel, with a sleeve freely rotatable on an axle that is held stationary when using the device, so as to permit rapid and trouble-free rotation of the sleeve with the line thereon, especially while unreeling said line in use.

An added object of the invention is to so construct a line-carrying unit, that the line may be easily and neatly wound thereon in alternate loops about the ends of the device, so as to wind the line in a substantially figure eight (8) formation, as this has been found by experience to maintain the line in good condition for the most years and will at the same time speed up both the winding and unwinding the line of the unit.

A still further object of the invention is to so construct such a reel unit, that the reel and the unwound portion of the line remaining thereon, may be suspended off the ground, simply by looping a portion of said unwound portion of the line about one end of the unit, so that the unit will be thus suspended for as long or short a period as is desired, from an anchorage point thereabove.

Many other objects and advantages of the construction herein shown and described will be obvious to those skilled in the art to which this invention appertains, as will be apparent from the disclosures herein given.

To this end, my invention consists in the novel construction, arrangement and combination of parts herein shown and described, and the uses

2 mentioned, and as will be more clearly pointed out in the following specification.

In the drawings, wherein like reference characters represent like or corresponding parts throughout the views, Figure 1 is a side elevation of said reel unit, with the clothes-line thereon, as suspended from adjacent a point of anchorage, such as the post shown; and Figure 2 is a longitudinal cross-section through the unit, with a portion shown in elevation.

Referring more particularly to the drawings, wherein I have illustrated a preferred embodiment of my invention, there is shown a clothes-line 1, of any length suitable for the purpose, and preferably of a relatively flexible material that will permit of coiling or winding the same about a core approximately as indicated.

It is not thought necessary to show the full length of the line, nor the particular manner of holding the same sufficiently taut for efficient service, and therefore only the final point of anchorage for the line is shown. A post, wall, or any structure 2 that may be used for the purpose, is indicated, and the same may be provided with a hook 3 about which the line may be looped and anchored.

The reel unit preferably comprises an elongated axle 4, of metal or other sufficiently sturdy material, and in order to conserve weight and cost, the same may be hollow or tubular, and the length of said axle is proportioned to accommodate the amount of line desired to be held.

A tubular sleeve 5 is freely rotatably mounted on said axle, and is preferably shorter than the latter so that the latter projects longitudinally to either end of the sleeve.

A collar 6 is keyed or otherwise fixed to the axle, at 7, to limit endwise movement of the sleeve relatively of the axle and serve as end bearings to abut the rotatable sleeve.

Handles 8 are secured to the opposite ends of the axle, and are preferably of rubber or the like, so as to avoid damaging woodwork or similar structure, and to provide a comfortable graspable portion at both ends of the unit.

These handles are positioned closely adjacent to the corresponding ends of the sleeves, so that when one walks along and holds the unit by either of its handles, the line will practically unwind itself as it causes the sleeve to rotate freely on the reel axle, and the manipulator of the unit has full control of this action and of the speed of the unreeling, by simply pressing the thumb of the grasping hand against the exterior surface of the rotating sleeve to thus exert a braking action to slow down or even stop rotation of the sleeve and the line carried thereon.

With a unit of the kind described, it is quite easy to keep the line from contacting the ground beyond the last point of securement of the line to the posts or the like, thus keeping the line clean and dry and prolonging its useful life. The handles are not only radially or transversely enlarged in order to make the holding of the same more comfortable, as at 9, but that portion or end of the handle that is closest the sleeve end is also radially or transversely projected, as at 10. These radial enlargements will act as abutments or stops, if the need therefor arises, when the device is suspended from above, as indicated in Fig. 1. For example, after the line has been anchored at such final point 2, the line is then simply looped over one end of the sleeve as indicated at 11, and when the unit is then suspended it will be found that the weight of the latter will cause the loop to tighten about the sleeve. As precautionary measures, the loop 11 may ride up to either the enlarged points 9 or 10 to more positively limit such longitudinal slippage of the line relatively of the unit.

Any desired means may be employed for attaching the line to the sleeve, and I have found that an extremely simple way of so doing is to first tie a thinner and more flexible cord 12 about the central portion of the sleeve, as by knotting it tightly thereat at 13, and then tying the free end of said cord to the heavier line itself.

One of the main reasons that the unit is so elongated, is to permit of unwinding and winding the line in a simple and predetermined manner, and with what may be termed a figure 8 formation, as indicated in Fig. 1. This formation will not only preserve and prolong the effective life of the line, but will make winding and unwinding easier and quicker, and minimize any tendency for the line to knot or kink.

In winding the line onto the sleeve, the unit may be held intermediate its ends by one hand, and then with alternate wobbling or oscillating of the unit, the line is first looped about one end of the unit, onto the sleeve portion of the same, and then brought up and looped about the other end of the unit, and this movement is continued until the line is fully wound thereonto.

In unwinding, the unit may be grasped by either of the handles, and then when the free end of the line is pulled outwardly from the reel, the line will unwind or unreel smoothly and rapidly as the sleeve rotates on the axle, the speed of such unwinding being controlled by the thumb of the reel-holding hand, as previously explained.

Having thus described my invention, it is obvious that various immaterial modifications may be made in the same without departing from the spirit of my invention; hence I do not wish to be understood as limiting myself to the exact form, arrangement, construction and combination of parts herein shown and described, or uses mentioned, except as limited by the state of the art to which this invention appertains, and by the claims hereunto appended.

What I claim as new and desire to secure by Letters Patent is:

1. A clothes-line reel unit comprising an elongated axle, a tubular sleeve freely rotatably mounted thereon, means at the ends of said axle and positioned longitudinally outwardly beyond the ends of said sleeve for grasping the unit from either end while unreeling said line and having portions extended radially beyond said sleeve and which form horizontally projecting abutments to support the unit from the line when the line is anchored from a point above the unit.

2. A clothes-line reel unit comprising an elongated axle, a clothes-line receiving tubular sleeve freely rotatable on said axle and terminating at points spaced inwardly from the axle ends, a handle mounted on each projecting end of said axle so that either handle may be grasped to support the unit while unreeling said line, a radially projecting collar on said axle between each handle and each end of said sleeve to provide end bearings for the latter and prevent axial shifting of the same, and a flexible cord anchored to said sleeve for attachment to one end of said clothes-line so that said line may be wound onto said sleeve by looping said line alternately about the projecting ends of said sleeve.

WILLIAM F. ALBERS.

References Cited in the file of this patent

UNITED STATES PATENTS

| Number | Name | Date |
|---|---|---|
| 406,672 | Schultze | July 9, 1889 |
| 1,212,376 | McNamara | Jan. 16, 1917 |